(12) United States Patent
Pechter et al.

(10) Patent No.: US 11,303,102 B2
(45) Date of Patent: Apr. 12, 2022

(54) REMOVING A METAL SHIELD FROM ELECTRICAL CABLE

(71) Applicant: Frisimos, Ltd., Ra'anana (IL)

(72) Inventors: Tal Pechter, Ramat Hasharon (IL); Hanan Ben-Ron, Givataim (IL)

(73) Assignee: Frisimos, Ltd., Ra'anana (IL)

( * ) Notice: Subject to any disclaimer, the term of this patent is extended or adjusted under 35 U.S.C. 154(b) by 64 days.

(21) Appl. No.: 16/679,588

(22) Filed: Nov. 11, 2019

(65) Prior Publication Data

US 2020/0083680 A1 Mar. 12, 2020

Related U.S. Application Data

(62) Division of application No. 15/114,920, filed as application No. PCT/IL2015/000009 on Feb. 23, 2015, now Pat. No. 10,476,245.

(60) Provisional application No. 61/943,782, filed on Feb. 24, 2014.

(51) Int. Cl.
| | |
|---|---|
| *H02G 1/12* | (2006.01) |
| *B23K 26/38* | (2014.01) |
| *B26F 3/02* | (2006.01) |
| *B23K 26/364* | (2014.01) |
| *B23K 101/38* | (2006.01) |

(52) U.S. Cl.
CPC ......... *H02G 1/1265* (2013.01); *B23K 26/364* (2015.10); *B23K 26/38* (2013.01); *B26F 3/02* (2013.01); *H02G 1/1297* (2013.01); *B23K 2101/38* (2018.08)

(58) Field of Classification Search
CPC .. B23K 2101/38; B23K 26/364; B23K 26/38; B23K 26/362; H02G 1/1265; H02G 1/1297; H02G 1/1248; B26F 3/02; B32K 26/364

USPC ..... 219/121.69, 121.76, 357; 140/1; 81/9.51
See application file for complete search history.

(56) References Cited

U.S. PATENT DOCUMENTS

| | | | |
|---|---|---|---|
| 3,032,604 A | 5/1962 | Timmons | |
| 3,149,390 A | 9/1964 | Mccoy | |
| 3,153,358 A | 10/1964 | Havems | |
| 3,768,143 A | 10/1973 | Holmes | |
| 3,881,374 A * | 5/1975 | Gudmestad | H02G 1/1265 81/9.51 |
| 3,953,706 A * | 4/1976 | Harris | B23K 26/103 219/121.68 |
| 4,455,745 A * | 6/1984 | Toeppen | H02G 1/1258 30/90.1 |
| 4,704,925 A | 11/1987 | Sutton | |

(Continued)

FOREIGN PATENT DOCUMENTS

| | | |
|---|---|---|
| JP | H02197206 A | 8/1990 |
| JP | 2008300110 A | 12/2008 |

OTHER PUBLICATIONS

European Office Action for EP Application No. 15751533.9 dated Aug. 27, 2018.

(Continued)

*Primary Examiner* — Helena Kosanovic
*Assistant Examiner* — Tiffany T Tran
(74) *Attorney, Agent, or Firm* — Lempia Summerfield Katz LLC

(57) ABSTRACT

A system for removing metal foil shield from electrical wires and/or cables, using ablation process, shear stress generation and video camera feedback.

18 Claims, 4 Drawing Sheets

(56) References Cited

U.S. PATENT DOCUMENTS

| | | | | |
|---|---|---|---|---|
| 4,766,669 A | * | 8/1988 | Schwartzman | H02G 1/1202 29/564.4 |
| 4,782,578 A | * | 11/1988 | Wu | H02G 1/1256 140/1 |
| 5,253,412 A | * | 10/1993 | Fukuoka | G02B 6/245 15/256.6 |
| 6,631,554 B1 | * | 10/2003 | Sato | H02G 1/128 174/880 |
| 2004/0099108 A1 | | 5/2004 | Viviroli et al. | |
| 2005/0006345 A1 | | 1/2005 | Thomas et al. | |
| 2005/0155956 A1 | | 7/2005 | Hamada et al. | |
| 2006/0065640 A1 | | 3/2006 | Lizotte et al. | |
| 2006/0084957 A1 | | 4/2006 | Delfyett et al. | |
| 2010/0282487 A1 | | 11/2010 | Tanaka | |
| 2011/0127697 A1 | | 6/2011 | Milne | |
| 2013/0240266 A1 | * | 9/2013 | Wakabayashi | H02G 15/025 174/84 R |
| 2014/0231484 A1 | * | 8/2014 | Arnold | B26F 3/02 225/1 |
| 2014/0290036 A1 | * | 10/2014 | Swenson | H02G 1/1265 29/566.4 |
| 2015/0290743 A1 | * | 10/2015 | Bachmeir | B23K 26/0823 219/121.72 |
| 2015/0357094 A1 | * | 12/2015 | Ishigure | H02G 1/1282 29/825 |

OTHER PUBLICATIONS

International Search Report dated Jun. 24, 2015, International application PCT/IL2015/000009 filed on Feb. 23, 2015.
IRSSLIM. Automated cable cutting machine (Genoa Mkll—2mm) [uploaded video] Jun. 6, 2011, retrieved on May 28, 2015 at the following URL https://www.youtube.com/watch?v=xfaHkcp6gws?
European Office Action for EP Application No. 15751533.9 dated May 27, 2019.

\* cited by examiner

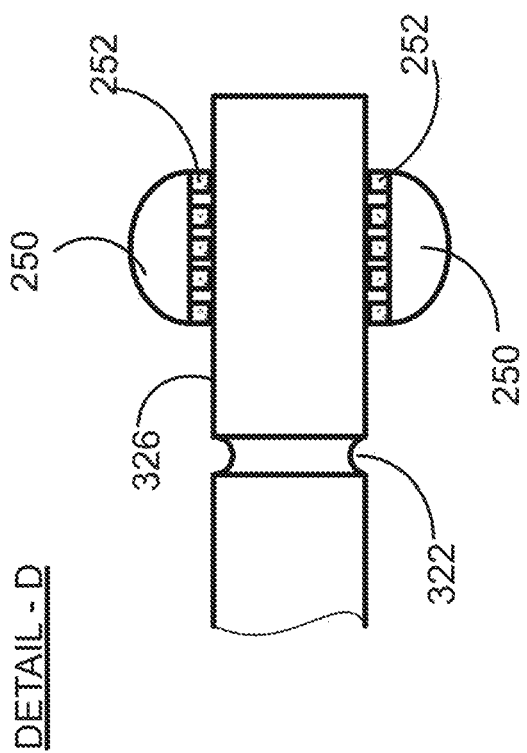

REMOVING A METAL SHIELD FROM ELECTRICAL CABLE

REFERENCE TO RELATED APPLICATIONS

The present application is a divisional application of U.S. application Ser. No. 15/114,920 (now U.S. Pat. No. 10,476,245), which is a US national phase application under 35 U.S.C § 371 of PCT Application No. PCT/IL2015/000009 (published as PCT Publication No. WO2015/125129 A1), which claims the benefit of U.S. Provisional Application No. 61/943,782. U.S. application Ser. No. 15/114,920 (now U.S. Pat. No. 10,476,245), PCT Application No. PCT/IL2015/000009 (published as PCT Publication No. WO2015/125129 A1), and U.S. Provisional Application No. 61/943,782 are each incorporated by reference herein in their entirety.

TECHNICAL FIELD

The present disclosure generally relates to electrical cable and connector industry, and in particular to a system and method for removing metal foil from electrical wires and/or cables.

BACKGROUND ART

Different electrical and electronic equipment and their devices communicate between them through physical connectors and cables. Each device and/or apparatus may have specific connectivity requirements. Connectivity requirements could relate to physical connectivity between devices and to the communication protocol. Physical connectivity requirements could include a range of amplitude of current and/or voltage, Electromagnetic Interference (EMI) protection and others. A cable is most frequently used to connect between different electric and electronic devices.

The cable is usually one or more wires running side by side. The wires can be bonded, twisted, or braided together to form a single assembly. Every current-carrying conductor, including a cable, radiates an electromagnetic field. Likewise, any conductor or cable will pick up electromagnetic energy from any existing around electromagnetic field. This causes losses of transmitted energy and adversely affects electronic equipment or devices of the same equipment, since the noise picked-up is masking the desired signal being carried by the cable.

There are particular cable designs that minimize EMI pickup and transmission. The main design techniques include electromagnetic cable shielding, coaxial cable geometry, and twisted-pair cable geometry. Shielding makes use of the electrical principle of the Faraday cage. The cable is encased for its entire length in a metal foil or a metal wire mesh (shield). The metal could be such as aluminum or copper.

Coaxial cable design reduces electromagnetic transmission and pickup. In this design the current conductors are surrounded a tubular current conducting metal shield which could be a metal foil or a mesh. The foil or mesh shield has a circular cross section with the electric current conductors located at its center. This causes the voltages induced by a magnetic field between the shield and the conductors to consist of two nearly equal magnitudes which cancel each other. To reduce or prevent electromagnetic interference, other types of cables could also include an electromagnetic shield.

Cable assembly is a process that includes coupling of cut to measure individual wires or pair of wires and a metal foil shield into an electrical cable. Connectors terminate one or both ends of the cable. Individual wires are stripped from the isolation and soldered to connector pins. If the cable contains a metal foil shield, the shield has to be at least partially removed to allow unobstructed access to the individual wires and pins.

At present at least the metal shield removal is performed manually with the help of a knife or a cutter that cut the shield. The cut segment of the metal shield is manually removed or separated from the remaining part of the electric cable. In some occasions the current conducting wires are damaged by the cutting tools. Such manual operation is slow, inaccurate, prone to error and costly.

SUMMARY

Presented is a system and method for removing a metal foil shield from an electric cable. The metal foil shield is removed using ablation process, shear stress generation and video camera feedback. The system includes a holder configured to hold an electrical cable, a laser configured to provide a laser radiation beam and an optical system configured to shape the laser radiation beam and concentrate the laser radiation beam on surface of the metal foil shield with power sufficient to ablate a groove on the surface of the metal shield and a gripper configured to grip a segment of the electrical cable that protrudes from the holder twist it such as to generate a shear stress in the groove and separate the segment of the electrical cable from the rest of the cable. The gripper includes a plurality of soft and sticky fingers configured to grip the segment of electrical cable that protrudes from the holder and avoid damage to the electrical cable.

The optical system includes a lens and a number of mirrors attached to a common mount. The lens concentrates the laser radiation on surface of metal foil shield and a motor rotates the common mount to scan the laser beam on the surface of the metal foil shield of the electrical cable. Linear movement of the lens supports ablation of different size electric cables. Control of laser beam power and pulse rate provides tools to gradually control the energy density.

A control computer controls all devices and processes of the system. The system also includes a number video cameras configured to observe at least the groove ablation and the segment of metal shield from the rest of the electric cable separation. The video cameras provide feedback to the control computer controlling among others the segment of metal shield from the rest of the cable separation.

BRIEF DESCRIPTION OF THE DRAWINGS

FIG. 3B is a detail of FIG. 3A; and

DESCRIPTION

The present document discloses a method and apparatus for metal foil shield from an electrical cable removal. The method is at least in part free of the drawbacks of manual metal foil shield removal. The apparatus is removing the metal foil shield using ablation process, shear stress generation and video camera feedback. As used in the current disclosure ablation is a process of removing material from a solid where the material is converted to another aggregate state without any interim aggregate state. For example, metal is converted to plasma or gas without being converted into a liquid state. Ablation supports selective material removal and depth of the grove generated by the ablation process. The process is extremely short and no heat is transferred to underlying wire isolation layers.

Figure 1:
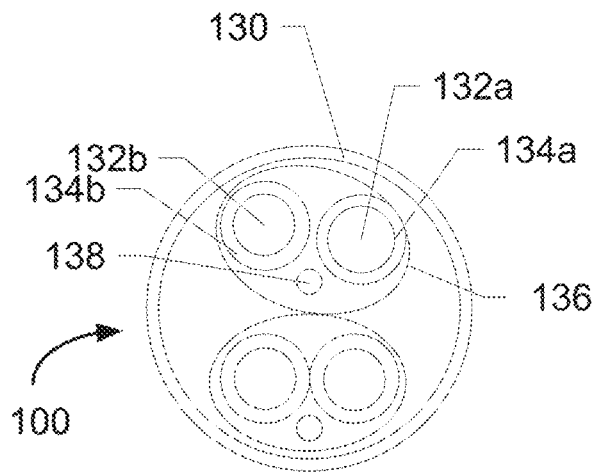
FIG. 1 illustrates an electric cable cross section according to an example.

Reference is made to FIG. 1 that illustrates an electric cable cross section according to an example. A shielded twisted pair (STP) cable 100 could include a shielding/screening sleeve or sleeves 130 and a plurality of twisted pair inner wires. Each of inner wires 132a and 132b is covered by isolation 134a and 134b. Inner wires 132a and 132b represent a twisted pair that could be further covered by a metal foil shield or sleeve 136. The particular cable 100 includes two sets of twisted pair wires. Each twisted pair could include an additional inner wire 138. Inner wire 138 may serve as a drain wire.

Figure 2:
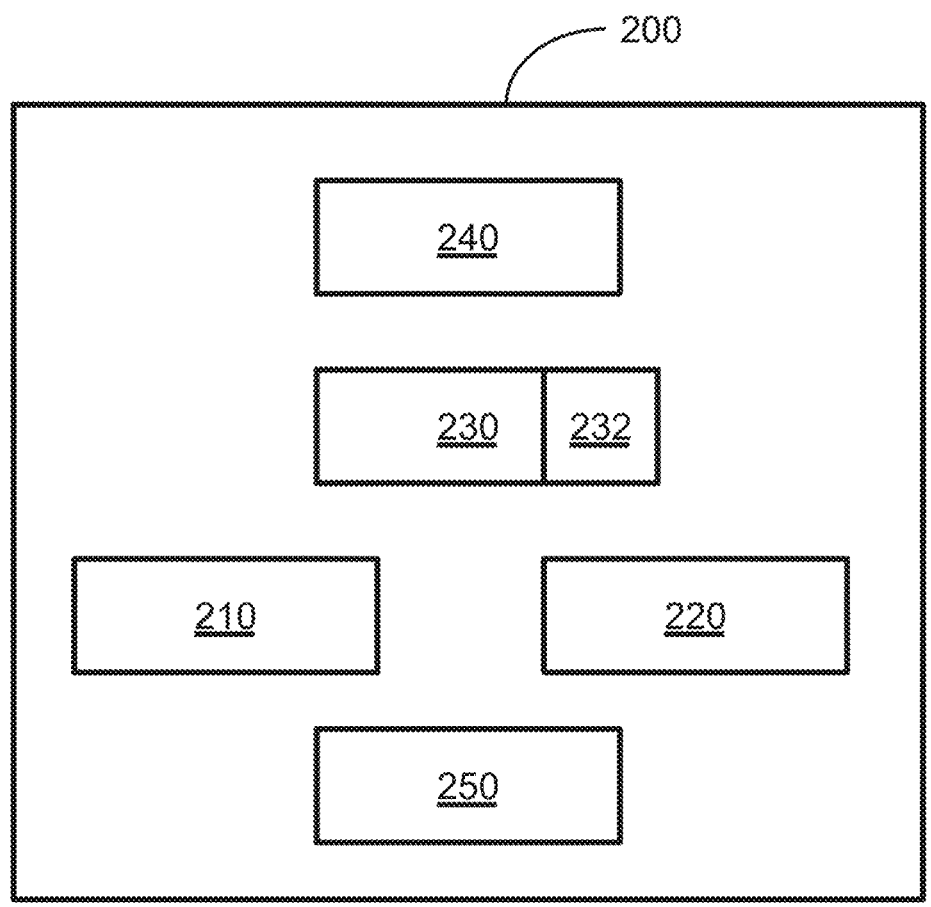
FIG. 2 is a schematic illustration of a simplified block diagram of a metal foil removal system according to an example.

FIG. 2 is a schematic illustration of a simplified block diagram of an example of a metal foil shield removal system. Metal foil shield removal system 200 includes a holder mechanism or simply a holder 210 configured to hold an electrical cable such that a segment of the electrical cable metal foil shield to be removed protrudes from holder 210; a metal foil shield ablation system 220, a control computer 230, which could be a personal computer (PC), a process monitoring system 240 and a gripper 250. Control computer 230 controls operation of all units and devices of the Metal foil removal system 200 or simply system 200.

Figure 3A:
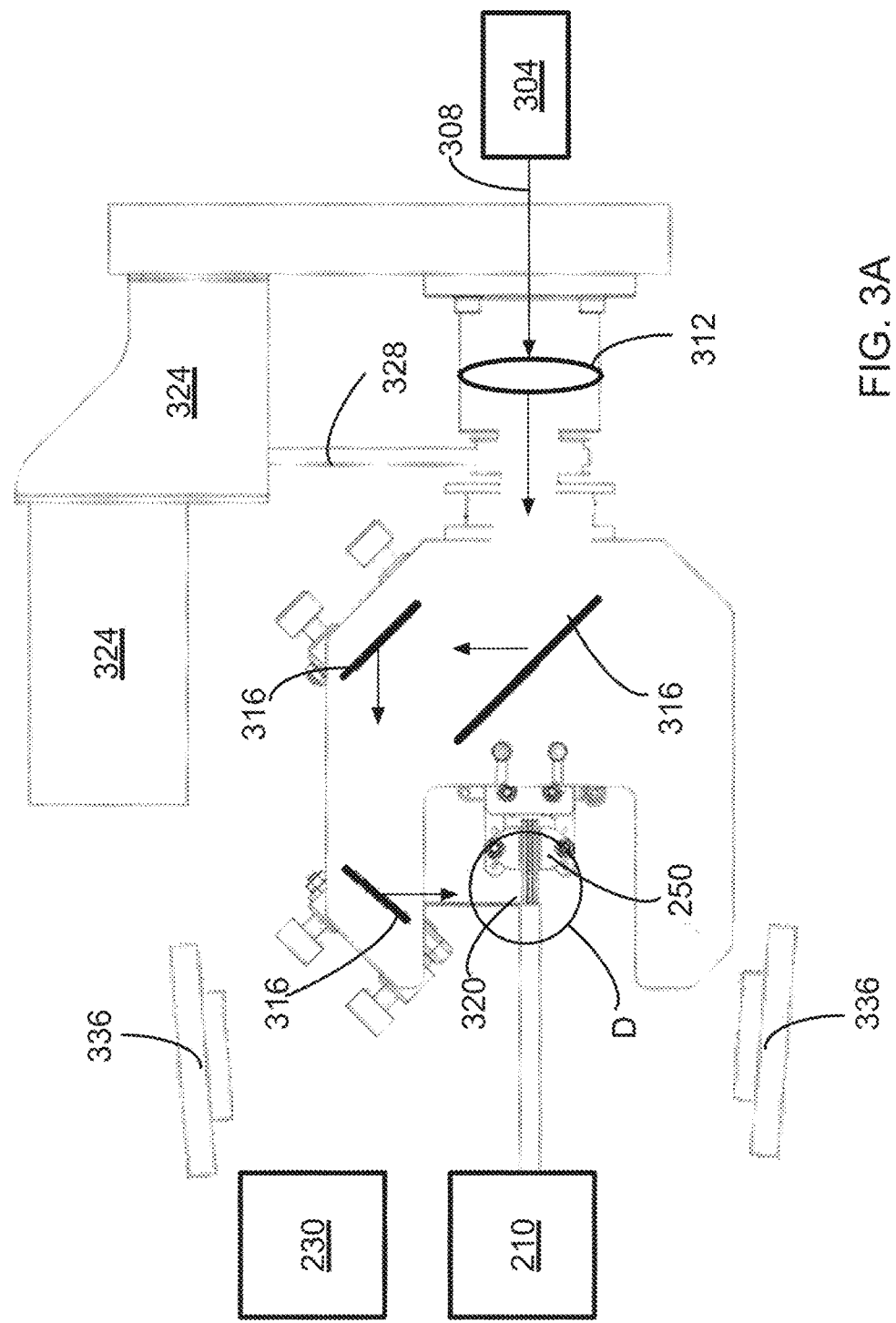
FIG. 3A is a schematic illustration of an example of a metal foil removal system.
Figure 4:
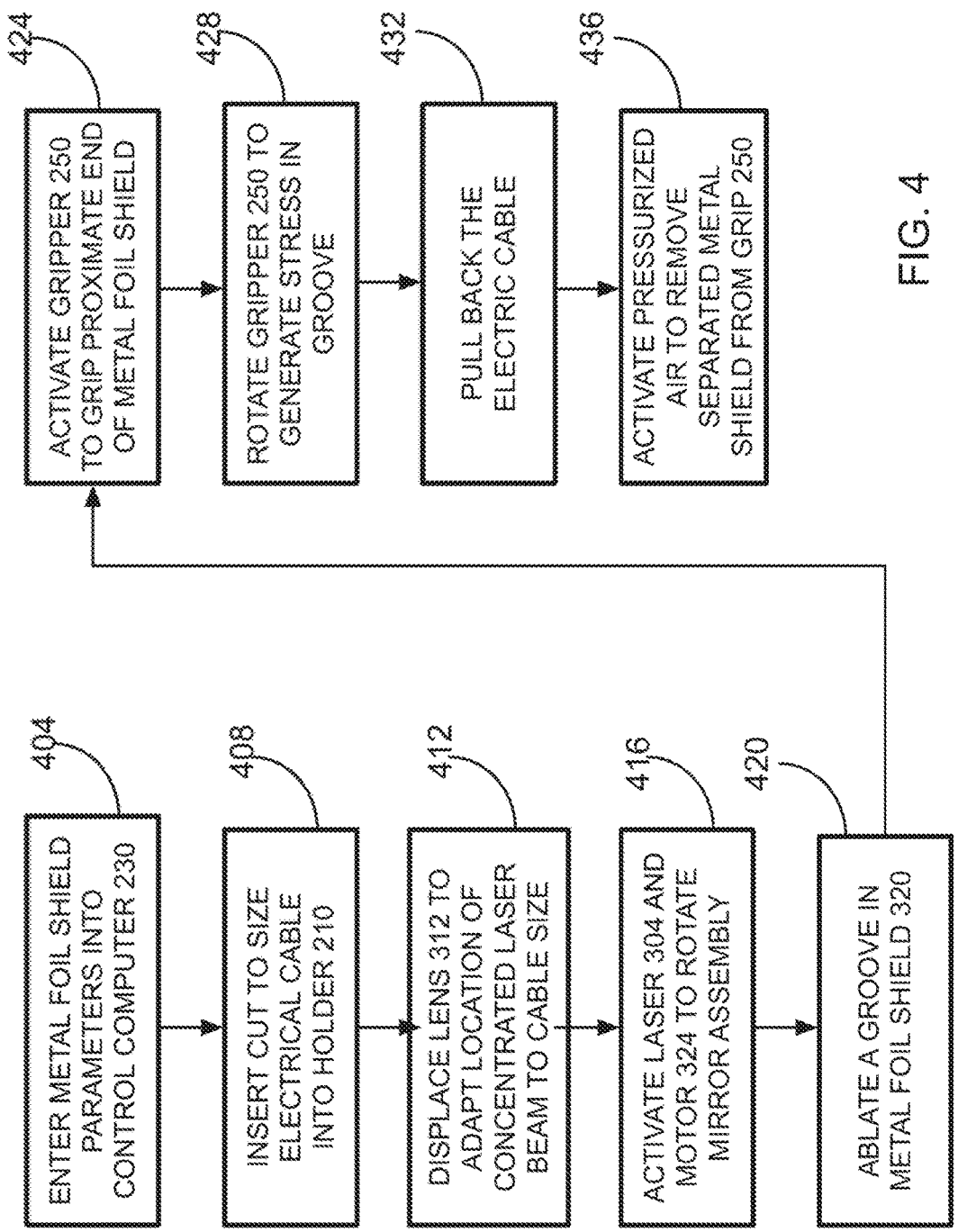
FIG. 4 is a flowchart illustrating the process of with relevant processes of metal foil shield removal according to an example.

FIG. 3A is a schematic illustration of an example of a metal foil removal system. Metal or foil shield ablation system 220 includes a laser 304 configured to provide a laser radiation beam 308 and an optical system that includes a lens 312 and a number of folding mirrors 316. Laser 304 could be such as a q-switched Pulse/CW fiber laser, commercially available from Optisiv Ltd. Kibbutz Einat 48805, Israel. (Fiber laser is a laser in which the active gain medium is an optical fiber doped with rare-earth elements such as erbium, ytterbium, neodymium, dysprosium, praseodymium, and thulium.) The fiber laser could be operated either in Pulse or Continuous Wave (CW) mode. Use of a fiber laser has some advantages over solid state lasers such as Nd-YAG, and gas lasers such as CO2. Fiber laser has a compact size, low cost, simple maintenance, and long life time, all of these are important for industrial use. The fiber laser in pulse mode generates pulses with duration from 300 psec to 500 nsec and peak power of 1 kw to 500 kw. The high peak power supports metal foil shield material removal by ablation without heating wire insulation layers located beneath the shield. Ablation produces a clean groove at different shield thickness. Fiber laser could be operated at a high Continuous Repetition Rate from a few KHz to 500 KHz, in pulse-on-demand mode or issue a burst of pulses. In some examples the fiber laser is providing laser radiation in continuous in an alternating or sequential mode where a number of pulses are followed by a continuous mode of operation and vise versa. High power emitted by the fiber laser supports efficient frequency conversion. Different wavelength such as 255-270 nanometers, 510-540 nanometers and 1020-1080 nanometers have been tested. Ablation of the metal foil shield was obtained at wavelengths of 1030 nm, 1064 nm, 532 nm, 355 nm or 266 nm.

The optical system is configured to shape the laser radiation beam 308 and concentrate the laser radiation beam 308 on surface 326 (Detail D) of the metal foil shield 320 with power sufficient to ablate at least some of the metal foil shield and form a groove 322 (Detail D) on surface 326 of the metal foil shield 320 protruding from holder 210. Motor 324 is operated to rotate the assembly of folding mirrors 316 around metal foil shield 320 to scan laser radiation beam 308 such that laser radiation beam 308 would be concentrated on the surface of metal foil shield 320. Rotation of the mirrors 316 assembly with proper concentrated laser radiation power ablates a certain depth of the metal shield 320 and ablates a groove 322. The depth of the groove could be 1.0 to 7.0 micron and the laser radiation power could be 1 kW to 500 kW.

In some examples the speed of rotation of the mirror assembly that delivers laser beam 308 to the metal foil shield can be used for to control the amount of laser power delivered to the metal foil shield. Control of the laser energy could be used to determine the depth of the groove 322 and corresponding reduction in the strength of the metal foil shield.

Monitoring system 240 can include one or more video cameras 332 and an image processing module 336. The video cameras can be placed in several locations around the perimeter or circumference of the electric cable. Video cameras 332 are configured to capture or help to observe the segment of the electrical cable that protrudes from holder 210 and in particular help to observe the groove 322 ablation and the segment of metal foil shield separation. Each of the cameras 332 can deliver the captured image to an image processing unit 336 that is configured to analyze the video images. The information derived from processing of the images received can be delivered as a feedback to the control computer 230.

Metal foil removal system 200 further includes a gripper 250 configured to grip a segment 320 of the electrical cable shield or foil that protrudes from holder 210 and is proximate to gripper 250, twist the segment 320 such as to generate a shear stress in the groove 322 (Detail D) and separate the segment 320 of the electrical cable that protrudes from holder 210 from the rest of the cable. In addition to twisting movement, separation of the segment of the electrical cable that protrudes from holder 210 is performed by linear movement of holder 210. In order to avoid damage to the electrical cable gripper 250 includes a plurality of soft and sticky fingers 252 (Detail D) configured to grip and hold the segment of electrical cable that protrudes from the holder and is proximal to gripper 250. Motor 324 could also provide the desired movement to gripper 250. Pressurized air activated or release the foil from the gripper.

As noted above, controller 230, could be a personal computer (PC) including a processor and memory Control computer 230 could communicate with other system 200 devices via industry standard communication buses and protocols. Different types of fixed 232 or removable memory such as RAM, ROM, magnetic media, optical media, bubble memory, FLASH memory, EPROM, EEPROM, etc. removable memory could be used to record for repeat use electric cable parameters and system 200 operating parameters. Computer 230 could also include a display and a keyboard, facilitating display and entry of information that could be required to operate system 200. Computer 230 could be also connected to a local area network or Internet.

Metal foil removal system 200 is adapted to receive electrical cables of different size (diameter or perimeter). Lens 312 could be displaced or moved to maintain a laser radiation concentration point on surface 326 (Detail D) of metal foil shield 320 of electrical cables with different size. Motor 324 could also be configured to displace or move lens 312 to maintain a laser radiation concentration point on surface 326 of metal foil shields of electrical cables with different size. Lens 312 displacement or movement also supports control of the concentration of the laser radiation on surface of the metal shield of the electrical cable. The rotating or scanning mirror system supports uniform energy density distribution along the metal foil shield perimeter.

Prior to system 200 operation a process of determination of laser radiation power sufficient to ablate a groove 322 in the metal foil shield 320 and separate the segment of metal shield from the rest of the cable. To determine the laser radiation power sufficient to ablate a groove 322 in metal foil shield 320, a cut to measure and stripped from its outer jacket and braded shield electric cable is inserted into holder 210. To facilitate the process, a set of parameters related to the sample cable inserted in holder 210 of system 200 could be entered into control computer 230. Alternatively, electrical cable parameters could be called from a look-up table stored in control computer 230 memory. The electrical cable parameters could be such as metal foil shield size, thickness, foil material and others. Laser 304 is activated and mirror assembly is rotated to ablate a circumferential groove 322 in the metal foil shield 320. The laser power is gradually increased until the laser power ablates a grove with sufficient depth supporting easy protruding metal foil shield segment separation. The determined electrical cable metal foil shield removal parameters could include mirror assembly rotation speed, pulse duration and repetition rate, pulse peak power and others.

The determined electrical cable metal foil shield removal parameters could be entered into control computer 230 (Block 404) and the process of metal foil shield removal for a batch of electric cables could be initiated. Cut to size electrical cable stripped from its outer jacket and a braded shield if such exists, is inserted (Block 408) into system 200 where holder 210 picks-up the electrical cable and advances it to a desired length that could be 1.0 to 250 mm. Lens 312 is displaced (Bloc 412) to adapt location of the concentrate the laser radiation beam 308 to the size (diameter) of the cable and locate concentrate the laser radiation beam 308 on surface 326 of the metal foil shield 320. Control computer 230 activates laser 304 and motor 324 that rotates the mirror assembly (Block 416). Since laser 308 is activated and emits laser radiation, rotation of mirror assembly ablates a groove 322 in the metal foil shield (Block 420). Laser 304 is deactivated after one full mirror assembly rotation. In some examples there could be more than one full mirror assembly rotation. Following completion of one full mirror assembly rotation, control computer 230 activates the pneumatic or electrical system and gripper 250 to grip the protruding (proximate) segment of metal foil shield (Block 424) located after the groove. Next gripper 250 is rotated. Sticky fingers 252 that firmly grip the metal-foil shield after the groove 322 force the segment of metal foil shield located after the groove 322 to rotate and generate shear stress (Block 428) in the groove 322 to tear the segment of metal foil shield.

Following the tear or separation of the segment of metal foil shield, holder 210 pulls the electric cable back (Block 432), to leave the removed segment of metal foil shield inside gripper 250. Gripper 250 is deactivated and a pressurized air pushes the removed segment of metal foil shield out of gripper 250. Next metal foil shield removal cycle could start.

In course of the process video camera 336 captures images of the groove 322 and the segment of metal foil shield following the groove 322 and communicates the images to control computer 230 that includes software adapted to perform analyses related to the accuracy of the place of the groove 322 and also verifies that there is not metal material left on the cable.

The described method and apparatus use ablation to produce a clean groove at different metal foil shield thicknesses and shear stress to remove a segment of the metal foil shield. It is clear that in the implementation of the apparatus and method many modification could be made to the system that carries out the described process. It should be considered that all modifications and alterations of the system and method are falling within the scope of the appended claims.

The invention claimed is:

1. An apparatus configured to remove at least a part of a layer from an electrical cable, the apparatus comprising:
   a holder configured to hold the electrical cable such that the layer is exposed;
   a laser configured to generate laser radiation;
   a gripper configured to grip a segment of the layer; and
   at least one controller in communication with the laser and the gripper, the at least one controller configured to:
      control the laser to generate the laser radiation in order to ablate a groove on a surface of at least a portion of the layer such that, after applying the laser radiation to ablate the groove on the surface, the layer at least partly remains under a circumference on the surface without exposing an interior insulating layer located beneath the layer;
      after finishing applying the laser radiation to ablate the groove on the surface of the at least the portion of the layer, cause, while the gripper is gripping the segment and the holder is holding the electrical cable, a twisting movement of the segment of the layer and a remainder of the electrical cable relative to one another in order to generate shear stress in the groove on the surface of the at least a part of the layer in order to tear the layer that at least partly remains under the circumference on the surface after finishing applying the laser radiation thereby separating the segment of the layer from the remainder of the electrical cable; and
      after causing the twisting movement thereby separating the segment of the layer from the remainder of the electrical cable, cause an at least partly linear movement of the segment relative to the remainder of the electrical cable in order to at least partly linearly move the segment away from the remainder of the electrical cable.

2. The apparatus of claim 1, further comprising at least one motor; and
   wherein the at least one controller is in communication with the at least one motor and is configured to cause the twisting movement in order to tear the layer that is left under the circumference on the surface after finishing applying the laser radiation by controlling the at least one motor while the gripper is gripping the segment.

3. The apparatus of claim 1, further comprising a pneumatic or electrical system and at least one motor;
   wherein the at least one controller is in communication with the pneumatic or electrical system and the at least one motor;

wherein the at least one controller is configured to activate the pneumatic or electrical system in order for the gripper to grip the segment of the layer; and wherein the at least one controller is configured, after activating the pneumatic or electrical system in order for the gripper to grip the segment of the layer and after finishing applying the laser radiation, to activate the at least one motor to rotate the gripper while the gripper is gripping the segment of the layer and while the holder is holding the electrical cable in order to generate the shear stress sufficient to tear the layer that is left under the circumference on the surface after finishing applying the laser radiation.

4. The apparatus of claim 1, wherein the layer comprises a metal shield.

5. The apparatus of claim 1, wherein the layer comprises a shielding layer.

6. The apparatus of claim 1, wherein the layer comprises a foil.

7. The apparatus of claim 1, wherein the layer comprises a mesh.

8. The apparatus of claim 1, wherein the at least one controller is configured to control the laser such that the groove is along an entirety of the circumference of the surface.

9. The apparatus of claim 8, further comprising a pneumatic or electrical system and at least one motor;

wherein the at least one controller is in communication with the pneumatic or electrical system and the at least one motor;

wherein the at least one controller is configured to activate the pneumatic or electrical system in order for the gripper to grip the segment of the layer; and wherein the at least one controller is configured, after activating the pneumatic or electrical system in order for the gripper to grip the segment of the layer and after finishing applying the laser radiation to ablate the groove, to activate the at least one motor to rotate the gripper while the gripper is gripping the segment of the layer in order to generate sufficient shear stress to tear the layer that is left under the circumference on the surface after finishing applying the laser radiation.

10. The apparatus of claim 9, further comprising an optical system configured to direct the laser radiation onto the surface of the at least a part of the layer;

wherein at least a part of the optical system is mounted onto a common mount; and wherein the at least one controller is configured to control the at least one motor and the laser such that the at least one motor rotates the common mount while the laser radiation is applied in order to apply the laser radiation onto the circumference of the electrical cable such that, after finishing applying the laser radiation, the groove is on an entirety of the circumference of the surface of the at least a part of the layer.

11. The apparatus of claim 10, wherein the gripper is also connected to the common mount; and wherein the at least one controller is configured to control the at least one motor to rotate the common mount while the gripper is gripping the segment of the layer in order to generate the sufficient shear stress in the groove on the surface of the at least a part of the layer to separate the segment of the layer from the remainder of the electrical cable.

12. The apparatus of claim 1, wherein the at least one controller is configured to cause the twisting movement by controlling movement of the gripper.

13. The apparatus of claim 12, wherein the at least one controller is configured to cause the at least partly linear movement by causing the holder to move linearly.

14. The apparatus of claim 1, wherein the at least one controller is configured to control the laser to apply the laser radiation to ablate the groove on the surface of the at least a part of the layer so that the laser radiation does not heat the internal insulating layer located beneath the layer.

15. The apparatus of claim 1, wherein the at least one controller is configured to cause the holder, while holding the electrical cable, to pull back in order to cause the at least partly linear movement of the segment relative to the remainder of the electrical cable; and wherein the at least one controller is further configured to cause application of pressurized air to remove the segment from the gripper.

16. The apparatus of claim 1, further comprising at least one image capture device configured to observe at least the groove;

wherein the at least one image capture device is configured to capture at least one captured image; and wherein the at least one controller is configured to analyze information derived from analyzing the at least one captured image in order to control separation of the segment from the remainder of the electrical cable.

17. The apparatus of claim 1, wherein the at least one controller is configured to cause the gripper to generate a twisting movement of the segment thereby rotationally moving the segment that protrudes from the holder.

18. The apparatus of claim 1, wherein the groove is along an entirety of the circumference on the surface of the layer.

* * * * *